June 5, 1928.
B. C. SKINNER
1,672,737
APPARATUS FOR HEATING FRUIT AND APPLYING PRESERVATIVES THERETO
Filed July 25, 1922
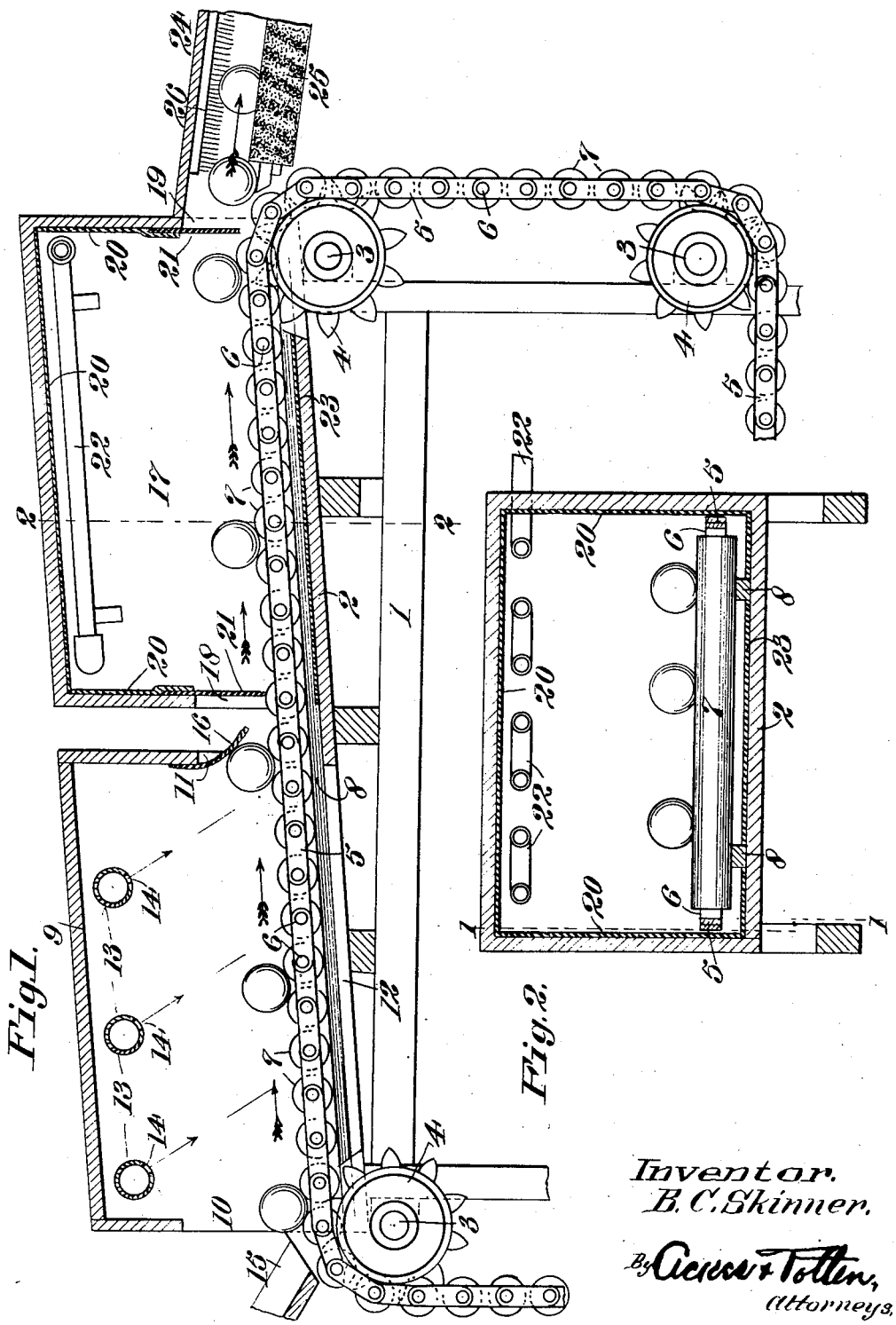
Inventor.
B. C. Skinner,
By Acker + Totten,
Attorneys.

Patented June 5, 1928.

1,672,737

UNITED STATES PATENT OFFICE.

BRONSON C. SKINNER, OF DUNEDIN, FLORIDA, ASSIGNOR TO THE BROGDEX COMPANY, OF WINTERHAVEN, FLORIDA, A CORPORATION OF FLORIDA.

APPARATUS FOR HEATING FRUIT AND APPLYING PRESERVATIVES THERETO.

Application filed July 25, 1922, Serial No. 577,412. Renewed November 28, 1925.

In the processing of fruit, particularly oranges, it has been found desirable to polish the surface thereof after a coating of polishing or preserving medium has been applied to the surface thereof, and it has been discovered that fruit so prepared has a greater sale, at a considerably higher price than unprepared fruit, and also that oranges prepared in such manner maintain their fresh appearance for a greater length of time and do not shrivel as do unprepared fruit.

This present invention relates to an apparatus for use in assisting in the polishing of the fruit and in its receiving the polishing and preserving medium during its passage through a fruit drying apparatus.

It is the present custom, after the fruit has been washed, to pass it through a drier and after being dried to subject it to the action of polishing brushes or rollers to impart to the surface a gloss, and the present invention consists in interposing between the drying and polishing apparatuses a heating apparatus through which the fruit is conveyed from the drying apparatus to the polishing apparatus, and during such conveying the skin or surface thereof is heated to receive a preservative coating, such as paraffin. This invention is designed and adapted for use in connection with driers which are at present installed and utilizes a portion of the drier conveyer for propelling the fruit through the heating apparatus.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 1 is a longitudinal sectional view through the preferred embodiment of my invention.

Fig. 2 is a transverse sectional view through the heating chamber, illustrating the heating units.

Referring more particularly to the drawings, wherein like characters of reference designate corresponding parts—1 indicates a supporting frame carrying an upwardly inclined bottom wall 2, which serves as the bottom or base for both the drying and heating apparatuses.

At the opposite ends of said wall 2 are mounted the parallel transverse shafts 3, and like shafts, are secured to the lower ends of the frame members 1. The shafts 3 mount on their opposite ends sprockets 4 and around said sprockets operate the endless conveyer chains 5, this conveyer chain construction in the present apparatus being thus of the endless type. The chain link end connecting pins 6 are in the form of extensions at the opposite ends of the fruit supporting rollers 7, the pins forming supporting axles therefor, and said rollers are disposed in parallel relation transversely between the chains 5.

In passing over the wall 2, the rollers 7 rest on and are supported by parallel spaced tracks 8 disposed longitudinally of the wall 2, and the contacting of the roller surfaces with these tracks causes a rotation of the rollers in the direction of the arrows—Fig. 1 of the drawings, which rotation imparts a reverse rotation to the fruit in its conveying by said rollers. At one end of the floor 2, over its upper surface, is positioned a chamber 9 provided at its opposite ends with the respective fruit inlet and discharge openings 10 and 11, through which passes the endless conveyer. The portion of the wall 2 beneath said chamber 9 is cut away, as at 12, and said chamber preferably at its upper end is provided with air inlet ducts 13 through which air is supplied into the chamber 9. The air ducts are provided interiorly of the chamber 9 with discharge perforations 14 through which air is directed downwardly onto the fruit as conveyed therethrough and said drying air passes from the chamber through the opening 12 in the floor thereof.

Fruit is delivered onto the conveyer adjacent the inlet opening 10 by any suitable means, such as an inclined chute 15, and to retard the passage of the air outwardly through the exit opening 11, said opening is provided with a flexible curtain 16.

It will be observed that the chamber 9 occupies only a portion of the longitudinal length of the upper surface of the frame 1 and that the remainder supports a heating chamber 17, provided with fruit inlet and discharge openings 18 and 19, through which passes the conveyer. The chamber 17 is lined preferably with heat insulating material 20, and over said openings 18 and 19 is provided with flexible curtains 21. A heating unit, illustrated in the present embodiment as a steam coil 22, is provided in the top of the chamber 17 to direct heat downwardly onto the fruit as it is conveyed therethrough and maintained in agitation by the rollers 7.

Over the upper surface of the bottom 2 is positioned a reflecting plate 23 for either absorbing or reflecting the heat directed thereonto from the unit 22. The fruit after being dried and passing through the chamber 17, in which chamber the surface or skin of the fruit is thoroughly heated, passes through the opening 19 into one end of a polishing apparatus 24 of the well known type. In the present invention this is illustrated in the form of the usual rotating brushes 25, and a means above the same, consisting of depending members 26 for applying, if it is desired, a coating of waxy coating material, such as paraffin, thereto.

It will be observed that in the polisher, the members for applying paraffin are illustrated in conventional form, and to these members may be supplied paraffin or other preservative coating adapted to coat or adhere to the surface of the fruit as the same is revolved by the brushes 25 when it passes into the polisher from the heating apparatus.

It will be observed that the polishing apparatus receives the fruit as discharged from the end of the endless conveyer and that in this embodiment the fruit in the polisher travels longitudinally thereof, solely by gravity.

Having thus described my invention what I claim as new and desire to protect by Letters Patent of the United States is:—

1. In combination, a fruit drying apparatus and a fruit polishing apparatus in adjacent co-operative relation, a fruit heating chamber positioned between the same for receiving the dried fruit from the drying apparatus, prior to its being conveyed into the polishing apparatus for the polishing thereof, means for conveying the fruit through said drying and heating apparatuses, and a heating element within said heating apparatus for heating the same.

2. In combination, a fruit drying apparatus and a fruit polishing apparatus in adjacent co-operative relation, a fruit heating chamber positioned between the same for receiving the dried fruit from the drying apparatus, prior to its being conveyed into the polishing apparatus for the polishing thereof, an endless travelling conveyer common to both said drying and heating apparatuses for conveying fruit progressively therethrough and for discharging the same into the polishing apparatus, and a heating element for heating said heating apparatus.

3. In combination, a fruit drying apparatus and a fruit polishing apparatus in cooperating relation and provided with fruit passages therethrough, a fruit heating chamber between said drying and polishing apparatuses, and provided with fruit inlet and discharge openings through which the fruit passes in its movement from said drying apparatus to said polishing apparatus.

4. Fruit treating apparatus comprising the combination, with roller conveyor means and heating means for warming fruit conveyed thereby, of fruit-polishing mechanism to which fruit is delivered from said conveyor means, and means cooperating with said polishing mechanism to apply waxy material to the fruit.

5. Fruit treating apparatus comprising, in combination, a fruit drying chamber, a heating chamber, means for applying coating material, and endless conveyor means operable to convey fruit through said chambers into operative proximity with such applying means.

6. Fruit treating apparatus comprising the combination, with means for drying fruit, of means for heating fruit, and means arranged to apply coating material to the heated fruit.

7. Fruit treating apparatus as defined in claim 6 in which the coating material includes a substance which is solid under ordinary temperatures but which is softened by heating.

In testimony whereof I have signed my name to this specification.

BRONSON C. SKINNER.